United States Patent [19]

Bunker et al.

[11] Patent Number: 5,609,066
[45] Date of Patent: Mar. 11, 1997

[54] MECHANISM FOR ACTUATING A VEHICLE PARKING BRAKE

[75] Inventors: Gavin Bunker, Stony Stratford; Timothy Bunker, Rearsby, both of United Kingdom

[73] Assignee: Simplistik Design Limited, United Kingdom

[21] Appl. No.: 50,364

[22] PCT Filed: Nov. 15, 1991

[86] PCT No.: PCT/GB91/02022

§ 371 Date: May 13, 1993

§ 102(e) Date: May 13, 1993

[87] PCT Pub. No.: WO92/08628

PCT Pub. Date: May 29, 1992

[30] Foreign Application Priority Data

Nov. 17, 1990 [GB] United Kingdom .................. 9025041

[51] Int. Cl.$^6$ .......................................... G05G 5/06
[52] U.S. Cl. .............................. 74/537; 74/538; 74/523; 74/524
[58] Field of Search .......................... 74/523, 535–538, 74/575–578, 524–526, 557, 501.5 R, 502, 541

[56] References Cited

U.S. PATENT DOCUMENTS

| | | | |
|---|---|---|---|
| 1,783,713 | 12/1930 | Holman | 269/168 |
| 2,220,131 | 11/1940 | Strange | 74/531 |
| 2,244,084 | 6/1941 | Saenger | 188/79.5 |
| 2,291,662 | 8/1942 | Thibeault | 188/79.5 |
| 2,322,585 | 6/1943 | Ojalvo | 74/526 |
| 2,553,479 | 5/1951 | Schmarje | 145/50 |
| 2,595,240 | 6/1952 | Glick et al. | 155/163 |
| 2,651,389 | 9/1953 | Wellwood | 188/199 |
| 2,802,553 | 8/1957 | Roggenstein et al. | 192/3 |
| 2,815,778 | 12/1957 | Holman | 144/303 |
| 2,890,596 | 6/1959 | Hatchett | 74/531 |
| 3,109,320 | 11/1963 | Krautwurst | 74/539 |
| 3,151,897 | 10/1964 | Wagner | 287/21 |
| 3,187,595 | 8/1965 | Clark | 74/156 |
| 3,271,071 | 9/1966 | Tabor | 297/375 |
| 3,383,135 | 5/1968 | Posh | 297/355 |
| 3,602,064 | 8/1971 | Francis | 74/512 |
| 3,621,929 | 11/1971 | Gale et al. | 192/111 A |
| 3,893,730 | 8/1975 | Homier | 297/375 |
| 4,127,042 | 11/1978 | Lipshield | 74/537 X |
| 4,212,211 | 7/1980 | Rickert | 74/538 |
| 4,378,713 | 4/1983 | Haskell et al. | 74/501.5 R |

(List continued on next page.)

FOREIGN PATENT DOCUMENTS

| | | | |
|---|---|---|---|
| 0317117A | 5/1989 | European Pat. Off. | 74/528 |
| 0443935A | 8/1991 | European Pat. Off. | 74/501.5 R |
| 0457461 | 11/1991 | European Pat. Off. | 74/541 |
| 0474328 | 3/1992 | European Pat. Off. | 74/545 |
| 2553479 | 4/1985 | France | 74/501.5 R |
| 3610525 | 10/1986 | Germany . | |
| 1409297 | 10/1975 | United Kingdom . | |
| 2175375 | 11/1986 | United Kingdom | 74/512 |
| WO85/03113 | 7/1985 | WIPO | 74/501.5 R |
| WO86/05849 | 10/1986 | WIPO | 74/501.5 R |
| WO89/00251 | 1/1989 | WIPO . | |

*Primary Examiner*—Vinh T. Luong
*Attorney, Agent, or Firm*—Seidel, Gonda, Lavorgna & Monaco, P.C.

[57] ABSTRACT

An actuating mechanism for a vehicle parking brake mounted in a vehicle consisting of the following elements. An actuator that is pivotally-mounted for movement between a first and second position. An elongate output member connected to a vehicle parking brake that is slidably mounted in the mounting structure. This elongate output member moves in a brake-applying direction in response to the movement of the actuator from the first to second position. A driver that alternates states between an uncoupled and coupled position in relation to the output member, in response to the movement of the actuator from the first to second position, respectively. A releasable holder that restrains the output member against reverse movement during movement of the actuator from second to first position, and a release mechanism for disengaging the releasable holder from the output member.

22 Claims, 4 Drawing Sheets

U.S. PATENT DOCUMENTS

| | | | |
|---|---|---|---|
| 4,381,053 | 4/1983 | Hyodo | 192/111 A |
| 4,387,926 | 6/1983 | Van Eerden et al. | 297/375 |
| 4,441,381 | 4/1984 | Haugk | 74/531 |
| 4,512,210 | 4/1985 | Gurney | 74/535 |
| 4,552,405 | 11/1985 | Wiers | 297/375 |
| 4,592,591 | 6/1986 | Wiers | 297/375 |
| 4,633,733 | 1/1987 | Tavener | 74/537 |
| 4,838,109 | 6/1989 | Stewart | 74/501.5 R |
| 4,841,798 | 6/1989 | Porter et al. | 74/501.5 R |
| 4,850,242 | 7/1989 | Hass et al. | 74/512 |
| 4,926,722 | 5/1990 | Sorensen et al. | 81/487 |
| 5,004,077 | 4/1991 | Carlson et al. | 188/2 D |
| 5,150,593 | 9/1992 | Kobayashi et al. | 74/538 X |
| 5,178,237 | 1/1993 | Ursel et al. | 74/538 |
| 5,247,850 | 9/1993 | Lenzke | 74/523 |

MECHANISM FOR ACTUATING A VEHICLE PARKING BRAKE

FIELD OF THE INVENTION

This invention relates to actuating mechanisms for parking brakes of vehicles.

BACKGROUND OF THE INVENTION

A known type of hand-operated vehicle parking brake uses a lever to tighten a brake cable, which is held taut by a locking pawl engaged with a ratchet. A typical lever ratio is 7 to 1 so a long lever is necessary. As the lever is integral with the mechanism, one cannot construct this lever from a flammable or meltable material such as certain plastics otherwise the brake could be released during a vehicle fire. During the lifetime of the vehicle adjustment of the hand brake is necessary, in order to take up sag in the cable. Hand brakes are noisy as the ratchet and pawl mechanism clicks as the brake is applied. Similar problems arise with foot-operated parking brakes. The object of this invention is to overcome some or all of these disadvantages.

SUMMARY OF THE INVENTION

The invention provides an actuating mechanism for a vehicle parking brake, comprising an actuating member which is movable relative to a mechanism mounting means between a first and a second position, an output member which moves in a brake-applying direction when the actuating member moves from its first to its second position, a drive means which releasably-couples the actuating member to the output member during movement of the actuating member from its first to its second position and which uncouples the said member as the actuating member is moved in the opposite direction, and a releasable holding means which restrains the output member against reverse movement during movement of the actuating member in the said opposite direction, and a release means for the holding means.

The actuating member is preferably pivotably mounted on the mounting means.

When such a mechanism is mounted in a vehicle, the actuating member will be positioned for hand or foot operation by the driver.

Preferably the actuating member is operated by manual means. The actuating member can comprise a lever, or a pistol grip which when pulled operates the actuating member. Alternatively the actuating member comprises a foot operated pedal.

Conveniently the release means is operated remotely from the actuating member. The release means may comprise either mechanical or hydraulic means. Preferably the release means comprises a hand operable portion of a lever actuating means adjacent a portion of the lever which is shaped for gripping by hand. The release means can be connected to the holding means by a link rod extending longitudinally within the lever.

The output member is connected to a rod, cable or other element linking it to the parking brake of the vehicle. Alternatively the output member may be the brake cable itself, which would be sheathed in a suitable protective material.

The output member which is preferably slidably mounted on the mounting means, can be elongate. The output member can be constructed with any suitable transverse cross section, which need not be uniform along its length.

The drive means or the holding means, or both, advantageously comprises an element which has an aperture through which the output member extends and through which the output member is free to move in the released position of the drive means or holding means, the drive or holding element being tiltable to engage the output member frictionally in their respective apertures.

The drive element is preferably resiliently biassed into a position which allows the output member to pass through its aperture. The holding element is preferably resiliently biassed into a position which prevents the output member from passing through its aperture.

Advantageously, the tiltable drive element abuts a cam surface of the actuating member, whereby the drive element is moved to its tilted position during movement of the actuating member from its first to its second position.

The cam surface of the actuating member may be formed by a captive roller rotatably mounted on a portion of the actuating member.

Preferably the mechanism includes means to compensate for wear in the brake mechanism of the vehicle. Such compensation means can comprise means to vary the rest position of the output member. When the output member is elongate, the compensation means can comprise an abutment element which abuts the mounting means to define the rest position of the mechanism and which is slidable on the output member so as to be brought into contact with a stop on the mounting means when adjustment is necessary, such contact moving the abutment element on the output member to re-define the rest position.

Alternatively, the compensation means can comprise resilient biassing means acting between the output member and the mounting means to apply a compensating force to the output member to define its rest position.

Retaining means can be provided to hold the compensation means within the actuating mechanism when a restraining force is not being applied to the output member.

Conveniently there is provided a means that senses when the parking brake has been applied and activates a remote signalling means that indicates when the parking brake has been applied.

BRIEF DESCRIPTION OF THE DRAWINGS

By way of example, embodiments of the invention will be described with reference to the drawings in which.

DETAILED DESCRIPTION OF THE INVENTION

Figure 1:
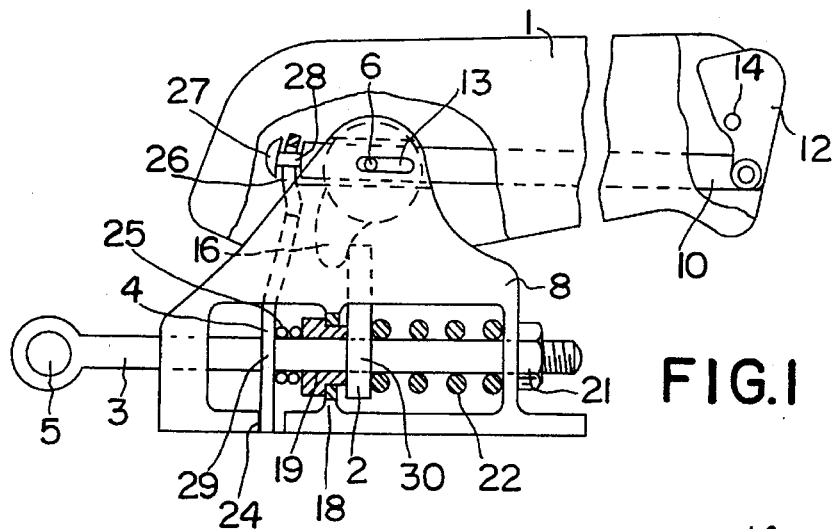
FIG. 1 is a side view of a hand-operated brake actuating mechanism with the brake off.

Referring to FIG. 1, the mechanism comprises a pivotable hand-operated actuator, in the form of an actuating lever 1, engaging a driver in the form of drive plate 2. Drive plate 2 moves an output rod 3, which can be frictionally held by a releasable holder in the form of lock plate 4. The rod 3 is connected to a brake cable through an eye 5. The actuator is variously referred to herein as actuating member, actuating means and actuating lever. The driver is various referred to herein as drive means, drive element and drive plate. The releasable holder is variously referred to herein as releasable holding means, holding means, holding element and lock plate.

Figure 8:
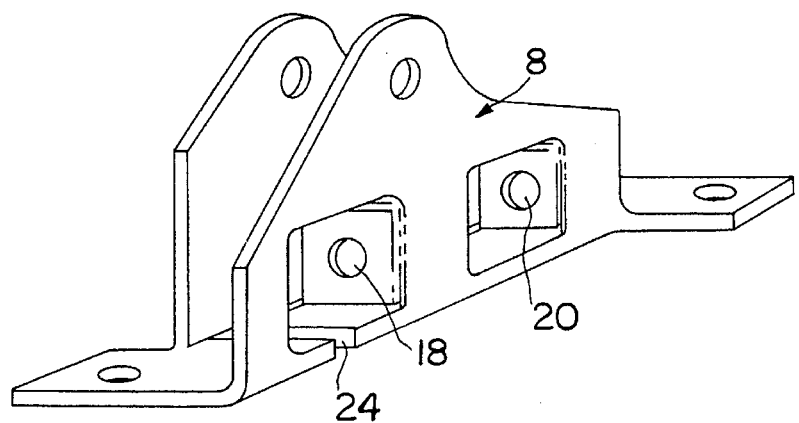
FIG. 8 is a perspective view of a frame part of the mechanism.

The lever 1 can rotate about a pivot pin 6 which is mounted in a frame 8 (see FIG. 8) rigidly fixed to the vehicle. A release button 12 pivots on a pin 14 fixed to the lever 1. The lever 1 has a cam surface 16 which abuts the drive plate 2.

A pull rod 10 is pivotally attached at its outer end to the release button 12 and extends within the lever 1. A slot 13 in the pull rod 10 receives the pivot pin 6 and allows longitudinal movement of the pull rod 10 relative to the lever 1.

The output rod 3 is mounted to slide through apertures in inwardly-turned tabs 18, 20 of the frame 8 and through an aperture 30 in the drive plate 2 and an aperture 29 in the lock plate 4. To facilitate the rod 3 sliding through the frame 8 a bush 19 is positioned on the tab 18. The drive plate 2 is constructed so it will frictionally hold the rod 3 unless substantially perpendicular with it. The lock plate 4 is arranged to frictionally hold the output rod 3 against movement in a direction which would release the brake, that is from right to left in FIGS. 1 to 3. If the plate 4 is substantially perpendicular with the output rod 3 then the rod 3 can move through the lock plate 4 in either direction. The end of the rod 3 is prevented from sliding through its aperture in the tab 20 by a nut 21 threaded on the end of rod 3.

The drive plate 2 is biassed to remain substantially perpendicular to the rod 3 by a helical compression spring 22 positioned concentrically around the rod 3 between the tab 20 and the drive plate 2.

The lock plate 4 has one end located in a recess 24 in the frame 8; the other end has a slot 26 through which a neck 28 formed near the inner end of the pull rod 10 extends. The inner end of the pull rod 10 terminates at a stop plate 27. A second spring 25 is positioned concentrically about the rod 3 between the lock plate 4 and the bush 19 such that the lock plate 4 is biased into a tilted position in which it engages the output rod 3.

A switch (not shown) which is sensitive to applied force is mounted on the output side of the output rod 3. When a force is applied to the brake cable which exceeds the force required to balance the spring 22, the switch operates a remote signalling means, for example a light on the facia, which indicates that the parking brake has been applied.

To apply the brake the lever 1 is raised manually, by rotating it anti-clockwise as viewed in FIG. 1, about the pivot 6. During this movement, the cam 16 tilts the drive plate 2 until this plate becomes frictionally engaged with the output rod 3. Further rotation of the lever 1 about the pivot 6 causes the output rod 3 to slide so as to tighten a brake cable pivotably attached to the eye 5 and so apply the brake.

Figure 2:
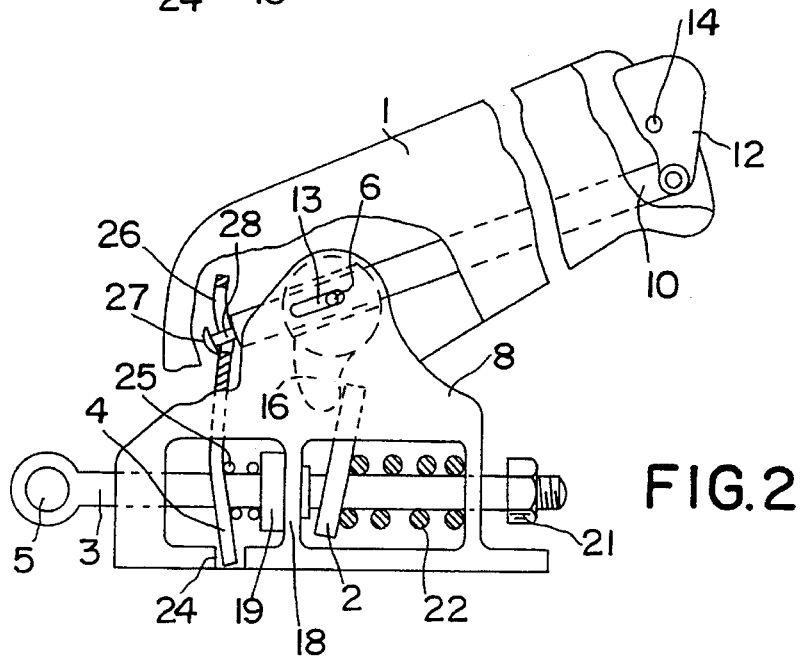
FIG. 2 is a side view of the brake actuating mechanism shown in FIG. 1 with the lever of the mechanism raised in order to apply the brake.

During initial raising movement of the lever 1, the inner end of the pull rod 10 follows the profile of the lock plate 4, the slot 26 in the lock plate 4 allowing movement of the pull rod 10 relative to the plate 4 and the upper portion of the plate 4 being arcuate to accommodate movement of the pull 10 rod as the lever 1 is raised. The pull rod 10 is thus prevented from sliding longitudinally relative to the pin 6 until a position of the lever 1 is attained in which the drive plate 2 has moved the output rod 3 forward. The next lower portion of the lock plate is shaped such that, towards the end of the raising movement of the lever 1, the lock plate is tilted relative to the output rod 3 to retain the rod against return movement, as shown in FIG. 2. The lever 1 can now be returned to its lowered position, during which movement the lock plate 4 retains its tilted position, in which it prevents return movement of the output rod 3.

Figure 3:
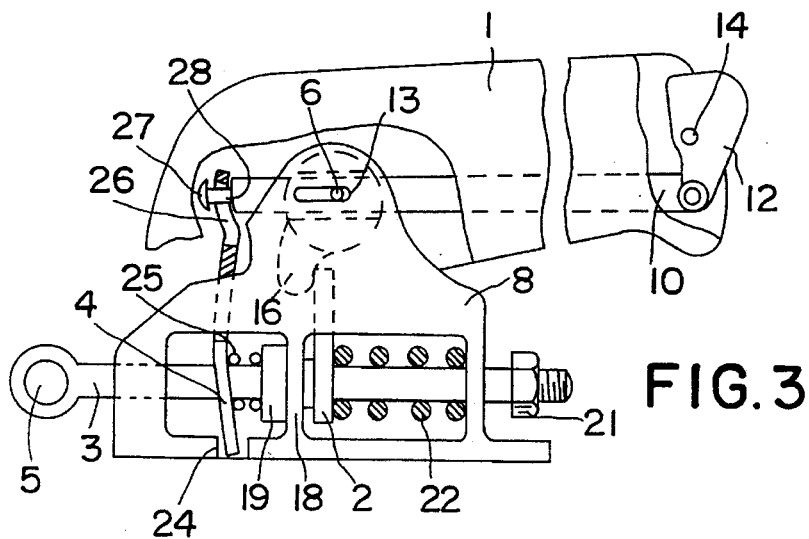
FIG. 3 is a side view of the brake actuating mechanism shown in FIGS. 1 and 2 with the lever lowered whilst the brake is still applied.

As the lever 1 is lowered, the spring 22 returns the drive plate 2 to a position substantially perpendicular to the output rod 3 and in which the plate 2 abuts the cam surface 16. During this lowering movement the pull rod 10 traces the profile of the lock plate 4 through the slot 26. The output rod 3 and lock plate 4 remain in frictional contact. The condition shown in FIG. 3 is thus established.

If desired, the lever 1 can be raised again in order to apply the brake further, the cam surface 16 moving the drive plate 2 again into its inclined position during such movement. The initial resultant movement of the output rod 3 tightens the engagement of the lock plate 2 with the output rod and allows further movement of the output rod to the right (as shown in FIGS. 1 to 3) to take place. The engagement between the lock plate and the output rod is re-established over the final portion of the raising movement of the lever 1.

In order to release the brake, the lock release button 12 must be depressed to rotate about the pin 14 which slides the pull rod 10 longitudinally relative to the pin 6 and releases the lock plate 4 from engagement with the output rod 3.

Thus the output rod 3 can now slide through the aperture 29 in the lock plate 4 and the brake is released.

In order to improve the engagement between the lock plate 4 and the output rod 3 in the embodiment described the contact surfaces of these components can, if desired, be suitably treated or shaped, for example roughened or serrated.

In the embodiment just described the rest position of the output rod 3 is determined by the nut 21 which must be adjusted from time to time. This tends to be a difficult operation. Modifications of the embodiment provide means to adjust the rest position of output rod 3 in order to compensate for a reduction in the brake cable tension over a vehicle's lifetime.

Figure 4:
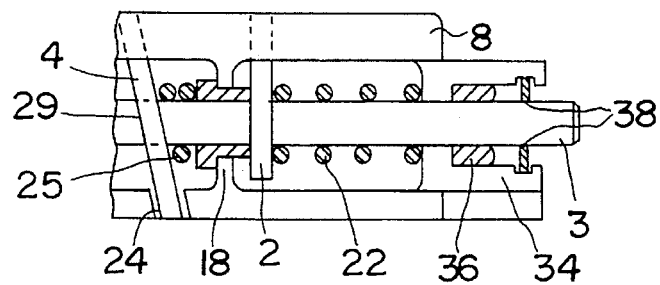
FIG. 4 is a side view of a first modification of part of the mechanism.

A means which compensates for cable sagging is shown in FIG. 4 and comprises a bush housing 34 forming an extension of the frame 8, a bush 36 which is an interference fit on the output rod 3 and a bush stop 38 on the housing 34. When the output rod 3 moves, the bush 36 and the rod 3 move together until the bush 36 abuts the stop 38. If the output rod 3 moves further it slides through the bush 36 which shortens the operative length of rod and thus compensates for any reduction in the cable tension.

Figure 5:
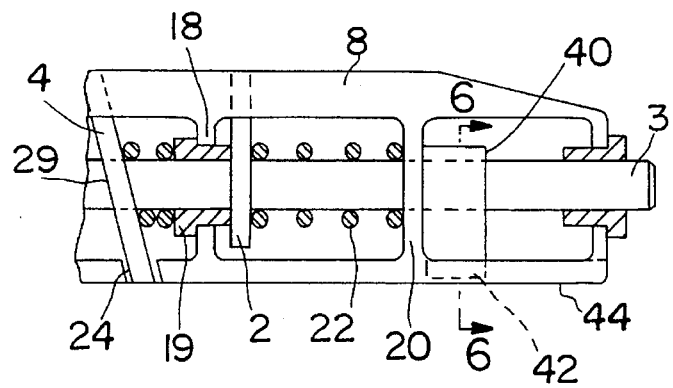
FIG. 5 is a side view of a second modification of part of the mechanism.
Figure 6:
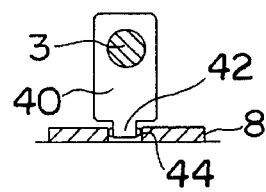
FIG. 6 is a section on the line 6—6 of FIG. 5.

An alternative adjusting means, shown in FIGS. 5 and 6, comprises a bush 40 with a rib 42, which is slidable within a slot 44 in the frame 8. The bush 40 is in interface fit with the output rod 3. As the mechanism is operated the bush 40 and the output rod 3 slide together until the bush 40 is arrested by the end of the slot 44, when the rod 3 slides through the bush 40 to take up any slack in the cable.

If either of the self adjusting mechanisms described above is fitted to the actuating mechanism, part of these self adjusting mechanisms can be used to signal that the parking brake has been applied. When the parking brake is applied the bush 36 or 40 moves, and a switch, sensitive to the position of the bush 36 or 40 operates a signalling device. Such a signalling means is shown in FIG. 11.

A peg 50, which protrudes from the siding bush 36 or 40, extends through a slot 51 in a tubular housing 52 with a closed end. The end of the peg 50 is located in a groove in a piston 53. The piston 53 which is an electrical conductor, is slidable within the housing 52 and is in electrical contact with an electrical terminal 54. A rivet 55 which is also an electrical conductor, is positioned between the closed end of housing 52 and the piston 53. The rivet 55 extends through a hole in the closed end of the housing. An electrical conductor 56 and a bush 57 are positioned between the head of the rivet 55 (which extends from the housing 52) and the outside of the housing 52. The electrical conductor 56 is in electrical contact with an electrical terminal 58. A spring 59 is mounted concentrically around that part of the rivet 55 which is inside the housing 52. The spring 59 abuts a plate 62 which forms the end of the rivet 55 furthest from the head of the rivet 55. The force of the spring 59 acting between the plate 62 and the inside of the housing 52 keeps the rivet head closely in contact with the conductor 56. A battery and a bulb are connected in series between the electrical terminals 54 and 58.

Figure 11:
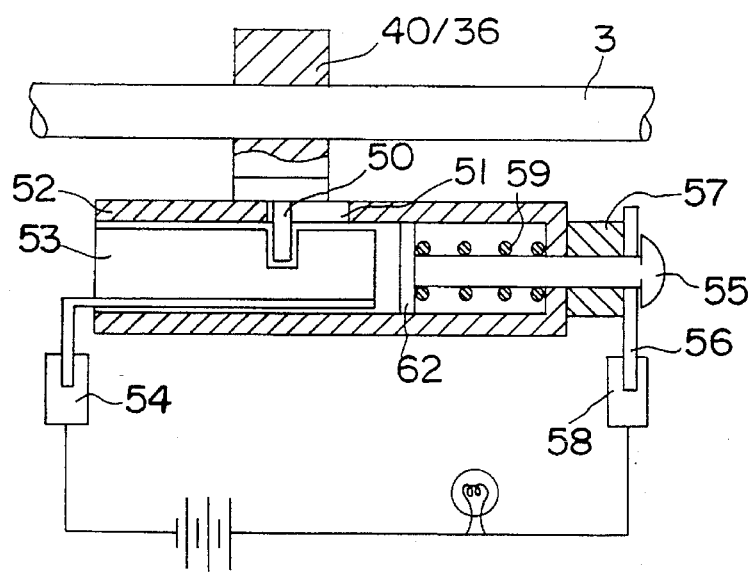
FIG. 11 is a side view of a mechanism for signalling that the brake has been applied.

When the actuating mechanism moves the output rod 3, bush 36 or 40 also moves, (to the right, as shown in FIG. 11). Thus the piston 53 also moves within the housing 52 such that the piston 53 initially makes contact with the plate 62 at the end of rivet 55 and then compresses the spring 59. Thus the electrical circuit between terminals 54 and 58 is completed and the bulb illuminates indicating that the actuating mechanism has tightened the brake cable and thus applied the brake. When the actuating mechanism is released the output rod 3 moves to the left as shown in FIG. 11 which moves bush 36 or 40 and hence peg 50 and piston 53 also to the left as shown in FIG. 11, and the contact between the piston 53 and the plate 62 is broken which extinguishes the bulb, indicating that the parking brake has been released.

Figure 7:
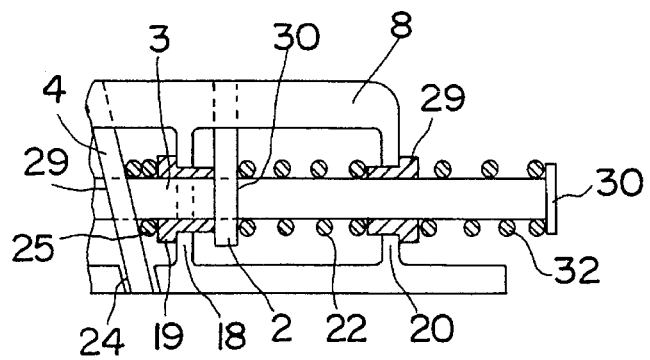
FIG. 7 is a side view of a third modification of part of the mechanism.

A further self-adjusting means is shown in FIG. 7 and comprises a bush 29 which is positioned on the tab 20 and through which the output rod extends, an abutment plate 30 fixed to the end of output rod 3, and a helical compression spring 32 mounted concentrically on the rod 3 between the plate 30 and the bush 29. The force exerted on the plate 30 by the spring 32 decreases the operating length of the output rod 3 when the tension in the brake cable decreases.

A shear pin or a wedge can be used to retain any of the self adjusting mechanisms within the actuating mechanism during assembly of the actuating mechanism.

Once the actuating mechanism has been fixed to a vehicle a brake cable is either attached to the output member or threaded through the mechanism to serve as the output member. The wedge or the shear pin lock the mechanism in the rest position. The first time the actuating mechanism is to be operated, either the wedge is removed, or the shear pin breaks as the actuating member is applied. The self adjusting mechanism then automatically alters the rest position of the output member to optimise operation of the actuating mechanism.

Figure 9:
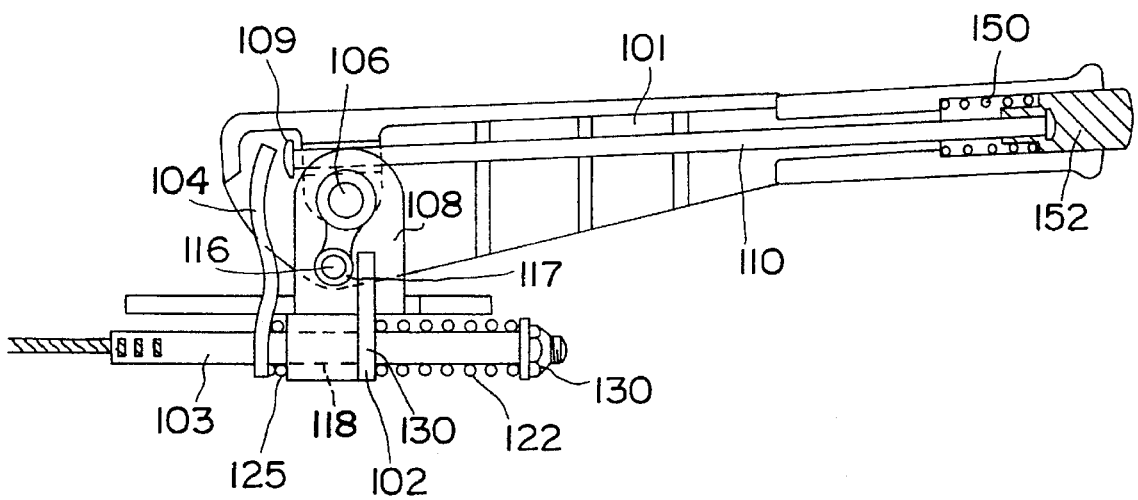
FIG. 9 is a side view of a second embodiment.

The second embodiment, shown in FIG. 9, is broadly constructed as the first embodiment with the following modifications. Elements corresponding to those of the first embodiment are numbered identically in FIG. 9 with the addition of one hundred.

The spring 122 which acts on the drive plate 102 also acts on an abutment plate 130 fixed to the end of the output rod 103. Thus the spring 122 automatically adjusts the cable tension and in addition biases the drive plate 102 into the upright position.

The pull rod 10 of the first embodiment is replaced by a push rod 110 which is slidable within the lever 101. To release the lock plate a button 152 is depressed. The button 152 is biased by a spring 150 to protrude from the end of the lever and is connected to the end of rod 110. The push rod 110 is retained in its rest position by a small collar 109 which is fixed to the push rod 110 and abuts against the lever 101 at a point adjacent to the pivot 106. The rod 110 moves down the lever, and pushes the upper end of the lock plate 104, slanted in the opposite direction from the first embodiment which releases the output rod 103. This arrangement has the advantage that because the push rod 110 pushes the lock plate to release the output rod 103, the lock plate 104 does not have to be connected to the rod 110 through a slot in the rod 10 as in the first embodiment. The upper end of the lock plate 104 and the push rod 110 are both shrouded by the lever 101.

The cam surface 116 is formed by a captive roller 117, in order to reduce wear.

The mounting bracket 108 includes a slot 130 within which the drive plate 102 can move. The length of the slot limits the travel of the drive plate 102, which prevents the cam 116 moving beyond the top of the drive plate 102.

Figure 10:
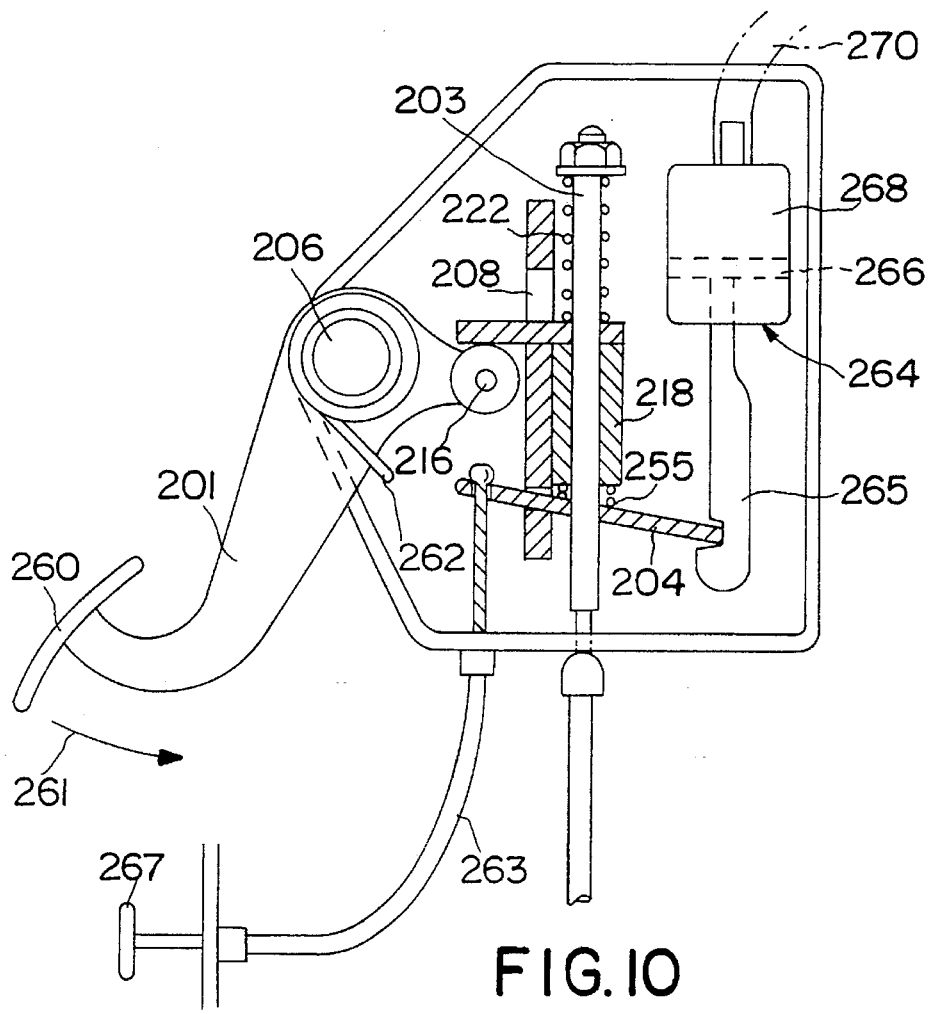
FIG. 10 is a side view of a third embodiment which is foot operated.

In the third embodiment, shown in FIG. 10, elements corresponding to those in the first embodiment are numbered identically with the addition of two hundred. In general the parts of the actuating mechanism that are not described below are arranged similarly to the previous embodiments.

The mechanism comprises a foot pedal 260 biased by a helical torsion spring 262 into a rest position as shown in FIG. 10. The pedal 260 is connected through a lever 201, a pivot 206 and a captive follower roller 216 to the drive plate 202. One end of the lock plate 204 is attached to a release cable 263. At the other end of the release cable 263 is a release handle 267. The other end of the lock plate 204 is attached to a release rod 265 which forms part of a pressure release mechanism shown generally as 264. The lock plate 204 can be attached to both the manual and the pressure operated release mechanisms as is shown in FIG. 10, or these two releasing mechanisms can be considered as alternatives, a single one of them being attached to either end of the lock plate 204.

The pressure release mechanism 264, comprises a release rod 265 attached to a piston 266 housed within a cylinder 268 which is connected via a fluid conduit 270 (e.g. an air line) to a means for reducing pressure (e.g. a pump).

To operate the parking brake (as viewed in FIG. 10) the foot pedal 260 is depressed against the spring 262, in the direction of arrow 261 which causes the left side of drive plate 202 to move upwards forcing the output rod 203 upward, tightening the brake cable. To release the parking brake the load on the system must be balanced by an applied load which is achieved by reapplying the foot pedal 260 of the parking brake. The lock plate 204 can then be pivoted in the correct sense to release the output rod 203, which can be achieved either manually by pulling handle 267 to tighten the release cable 263, or by reducing the pressure to the pressure system 264 which moves rod 265 upward (as viewed in FIG. 10).

The pressure system can be actuated remotely from an electrical switch on the dash board, or automatically such as in response to a means for detecting that the accelerator pedal is depressed. Such detection means could operate as follows. The source of reduced pressure in the pressure means 264 of this embodiment is the pressure differential across the engine manifold. When the car is parked the engine is idle, and there is not a large enough pressure differential across the pressure release mechanism 264 to release the lock plate 204. However, when the accelerator is depressed the pressure differential across the engine manifold increases to its maximum and hence the pressure release mechanism 264 can pivot lock plate 204 to release the parking brake.

Brake actuating mechanisms according to some or all of these embodiments have several advantages over the prior art.

The actuating lever can be made from flammable, light-weight materials such as moulded plastic. This enables the lever to be mass produced cheaply in a variety of shapes and colours.

When the lever is raised, the point at which the force is applied to the drive plate by the cam surface moves, increasing the mechanical ratio of the lever to the drive plate. Thus the work required to produce a given force on the cable reduces as the brake actuator is applied. In any event less work is required to tighten the brake cable compared with a traditional hand brake. This is a particular advantage for drivers who are disabled, elderly or infirm. The reduced mechanical ratios required allow the mechanism to be made smaller, which further reduces its weight and cost.

Because the actuating mechanism does not use a ratchet and pawl mechanism, the actuation mechanism is very quiet to operate, operates continuously on the brake cable rather than in steps, and reduces or eliminates the free travel of the actuator before the brake cable tightens. This is to be compared with known handbrakes, which typically apply no work to the brake cable during the first three clicks of the ratchet.

The mechanism can self adjust for variations in brake cable tension and prevent sagging. This reduces maintenance costs and improves the safety and reliability of the actuating mechanism. A wedge or shear pin holds the self adjusting part of the actuating mechanism until the initial operation of the actuating member. Thus assembly of the whole mechanism is made easier. Once the actuating member is applied the self adjusting mechanism optimises the position of the output member which removes the need for adjustments to be made on the vehicle assembly line. This saves time and reduces the assembly cost of the vehicle. The mechanism can be removed or replaced from the vehicle easily, and can be attached to a variety of different vehicles without modification because the self adjusting mechanism optimises the actuating mechanism for operation in each vehicle.

We claim:

1. An actuating mechanism for a vehicle parking brake, comprising fixed mounting means for mounting the mechanism in a vehicle, an actuator which is pivotally mounted on the mounting means for movement relative thereto between a first and a second position, an elongate output member for connection to a vehicle parking brake, the elongate output member being slidably mounted in the mounting means and arranged to move in a brake-applying direction frown a brake-off to a brake-on position when the actuator moves from its first position to its second position, a driver which is uncoupled from the output member when the actuator is in the first position, which releasably couples the actuator to the output member during movement of the actuator from its first to its second position, and which uncouples the output member as the actuator is returned in the opposite direction from its second to its first position, a releasable holder which restrains the output member against reverse movement from its brake-on to its brake-off position during movement of the actuator in the said opposite direction, and a release means for the releasable holder for disengaging the holder from the output member.

2. A mechanism according to claim 1, in which the actuator is operated manually.

3. A mechanism according to claim 1, in which the actuator is a lever.

4. A mechanism according to claim 3, in which the release means comprises a hand-operable portion of the lever which is adjacent a portion of the lever which is shaped for gripping by hand.

5. A mechanism according to claim 1, in which the actuating member comprises a foot operated pedal, biased to extend upwardly and forwardly, which when depressed operates the actuating member.

6. A mechanism according to claim 1, in which the release means is operated at a position separated from the actuating member.

7. A mechanism according to claim 1, in which the release means comprises a mechanical means.

8. A mechanism according to claim 1, in which the release means comprises an hydraulic means.

9. A mechanism according to claim 8, in which the release means is connected to the releasable holder by a link rod extending longitudinally within the lever.

10. A mechanism according to claim 1, in which means are included that senses when the parking brakes have been applied, and activate a remote signalling means to indicate that the parking brake has been activated.

11. A mechanism according to claim 10, in which the sensing means comprises a switch sensitive to applied force mounted on the output side of the output member.

12. A mechanism according to claim 1, in which means are included to compensate for the war in the brake mechanism of the vehicle, the compensation means comprising means to vary the rest position of the output member.

13. A mechanism according to claim 12, in which the compensation means comprises an abutment element which abuts the mounting means to define the rest position of the mechanism and which is slidable on the output member so as to be brought into contact with a stop on the mounting means when adjustment is necessary, such contact moving the abutment element on the output member to re-define the rest position.

14. A mechanism according to claim 13, in which the sensing means comprises a switch sensitive to the position of the slidable abutment element.

15. A mechanism according to claim 12, in which the compensation means comprises resilient biassing means acting between the output member and the mounting means to apply a compensating force to the output member to define its rest position.

16. A mechanism according to claim 12, in which retaining means are provided to hold the compensate means within the actuating means, when a restraining force is not being applied to the output member.

17. A mechanism according to claim 1, in which the driver includes an aperture through which the output member extends and is free to move when the driver is the released position, the driver being adapted to be tilted to engage the output member frictionally in said aperture.

18. A mechanism according to claim 17, in which the driver is resiliently biased into a position which allows the output member to pass through the aperture in the driver.

19. A mechanism according to claim 17, in which the driver abuts a cam surface of the actuator, whereby the driver is moved to its tilted position during movement of the actuator from its first to its second position.

20. A mechanism according to claim 19, in which the cam surface of the actuating member is formed by a captive roller rotatably mounted on a portion of the actuating member.

21. A mechanism according to claim 1, in which the releasable holder includes an aperture through which the output member extends and is free to move when the holder is in the released position, the releasable holder being adapted to be filtered to engage the output member frictionally in said aperture.

22. A mechanism according to claim 21, in which the releasable holder is resiliently biased into a position which prevents the output member from passing through the aperture in the releasable holder.

* * * * *